(12) United States Patent
Bak et al.

(10) Patent No.: US 11,838,569 B2
(45) Date of Patent: Dec. 5, 2023

(54) METHOD AND APPARATUS FOR PROVIDING USER-WISE PLAYING RATE INFORMATION

(71) Applicant: NAVER CORPORATION, Gyeonggi-do (KR)

(72) Inventors: Su Bin Bak, Seongnam-si (KR); Jung Min Lee, Seongnam-si (KR); Jung Pil Lee, Seongnam-si (KR); Seok Woo Lee, Seongnam-si (KR); Hyun Min Lee, Seongnam-si (KR); Sang Joon Lee, Seongnam-si (KR); Ji Hoon Ko, Seongnam-si (KR); Hyo Jong Kim, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 1 day.

(21) Appl. No.: 17/369,072

(22) Filed: Jul. 7, 2021

(65) Prior Publication Data
US 2022/0014801 A1  Jan. 13, 2022

(30) Foreign Application Priority Data

Jul. 7, 2020  (KR) .................. 10-2020-0083621

(51) Int. Cl.
*H04N 21/2387* (2011.01)
*H04N 21/422* (2011.01)
*H04N 21/442* (2011.01)

(52) U.S. Cl.
CPC ..... *H04N 21/2387* (2013.01); *H04N 21/4221* (2013.01); *H04N 21/42209* (2013.01); *H04N 21/44204* (2013.01)

(58) Field of Classification Search
CPC ........ H04N 21/2387; H04N 21/42209; H04N 21/4221; H04N 21/44204
See application file for complete search history.

(56) References Cited

U.S. PATENT DOCUMENTS

| 9,930,094 B2 | 3/2018 | Ahn et al. |
| 2010/0086277 A1* | 4/2010 | Craner ............... H04N 21/4424 386/278 |

(Continued)

FOREIGN PATENT DOCUMENTS

KR   10-2013-0109450 A   10/2013

OTHER PUBLICATIONS

Korean Office Action dated Jul. 28, 2021 issued in corresponding Korean Patent Application No. 10-2020-0083621.

*Primary Examiner* — Jefferey F Harold
*Assistant Examiner* — Alexander Boyd
(74) *Attorney, Agent, or Firm* — Harness, Dickey & Pierce, P.L.C.

(57) ABSTRACT

Provided are a method and apparatus for providing image playing rate information. The method including receiving, from a user terminal, a target image request signal, transmitting, to the user terminal, a target image in a first state or the target image in a second state, based on whether the target image request signal satisfies a specified standard, obtaining, from the user terminal, state information and image playing information of the target image for each specified time, and providing user-wise playing rate information of the target image, based on the state information and image playing information of the target image may be provided.

16 Claims, 12 Drawing Sheets

(56) References Cited

U.S. PATENT DOCUMENTS

| | | | |
|---|---|---|---|
| 2012/0060181 A1* | 3/2012 | Craner | H04N 21/4882 725/28 |
| 2016/0014461 A1* | 1/2016 | Leech | H04N 21/44204 725/14 |
| 2018/0191857 A1* | 7/2018 | Schooler | G06F 16/24568 |
| 2019/0141399 A1* | 5/2019 | Auxer | H04N 21/4753 |

* cited by examiner

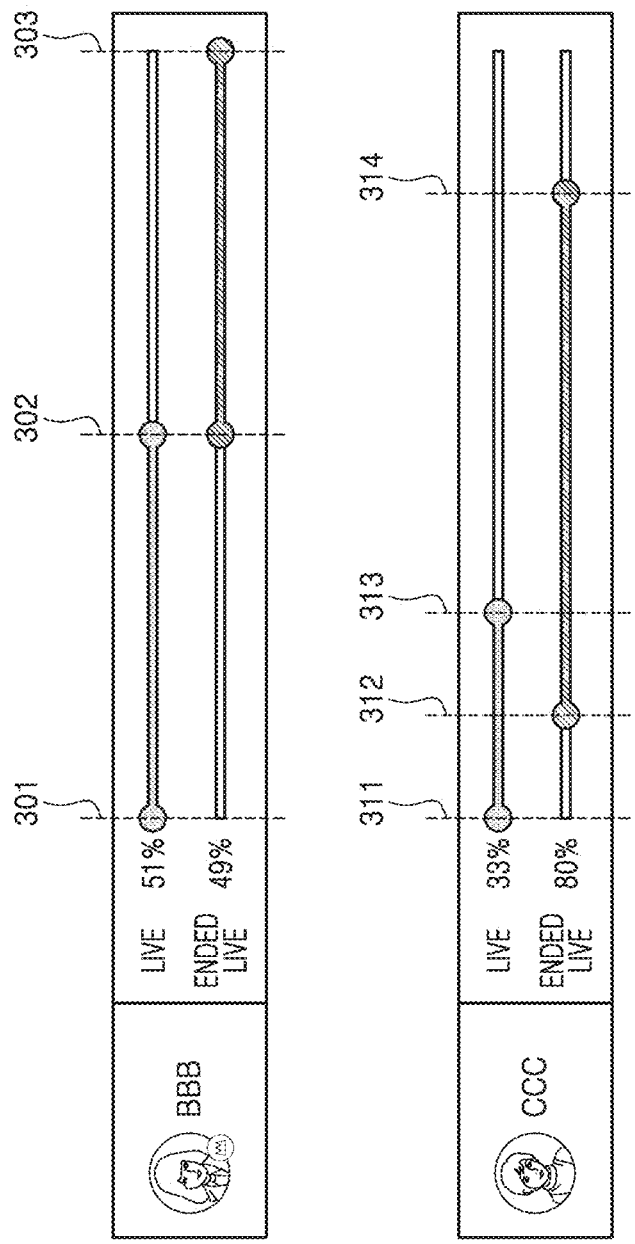

METHOD AND APPARATUS FOR PROVIDING USER-WISE PLAYING RATE INFORMATION

CROSS-REFERENCE TO RELATED APPLICATION

This application is based on and claims priority under 35 U.S.C. § 119 to Korean Patent Application No. 10-2020-0083621, filed on Jul. 7, 2020, in the Korean Intellectual Property Office, the disclosure of which is incorporated by reference herein in its entirety.

BACKGROUND

1. Field

The present disclosure relates to methods and/or apparatuses for providing user-wise playing rate information. More particularly, the present disclosure relates to methods and/or apparatuses for providing user-wise playing rate information with respect to a real-time image or a recorded image.

2. Description of Related Art

This section provides background information related to the present disclosure which is not necessarily prior art.

The use of an image platform has become active with the spread of a non-contact culture (or alternatively, referred to as a contactless or an untact culture). Most platforms that output images only provide information about the number of real-time viewers for each image or the number of accumulated viewers, and do not provide information about viewers who played the images. Even when a recorded broadcast is transmitted, only playing rate information based on a population is provided by using the information about the number of accumulated viewers.

Accordingly, it is difficult to obtain user-centered (or user-specific) data, for example, which section of an image is played by a specific viewer or which viewers are playing the image.

The aforementioned background technology is technical information possessed by the inventor for derivation of the present disclosure or acquired by the inventor during the derivation of the present disclosure, and is not necessarily prior art disclosed to the public before the application of the present disclosure.

SUMMARY

This section provides a general summary of the inventive concepts, and is not a comprehensive disclosure of its full scope or all features of the inventive concepts.

Some embodiments of the present disclosure provide methods and/or apparatuses for obtaining and managing image playing information of individual users who played an image.

Additional aspects will be set forth in part in the description which follows and, in part, will be apparent from the description, or may be learned by practice of the presented example embodiments.

A method of providing image playing rate information, according to an example embodiment of the present disclosure, may include receiving, from a user terminal, a target image request signal, transmitting, to the user terminal, a target image in a first state or the target image in a second state, based on whether the target image request signal satisfies a specified standard, obtaining, from the user terminal, state information and image playing information of the target image for each specified time, and providing user-wise playing rate information of the target image, based on the state information and image playing information of the target image.

The target image request signal may include time information about a time when the target image request signal is received from the user terminal, and the transmitting may include transmitting, to the user terminal, the target image in the first state, which is a real-time image, when the time when the target image request signal is received is included in a real-time target image broadcasting time section, and transmitting, to the user terminal, the target image in the second state, which is a stored image, when the time when the target image request signal is received is after the real-time target image broadcasting time section.

The target image request signal may include user information of the user terminal, and the transmitting the target image in the first state or the transmitting the target image in the second state may include transmitting, to the user terminal, the target image in the first state or the target image in the second state, based on presence of target image playing authority that has been determined based on the user information.

The image playing information may include information related to image playing of the user terminal, and the obtaining may include obtaining a data pair including the state information and information related to image playing of the target image received by the user terminal, for each specified time section, based on a playing time of the target image.

The providing may include providing user-wise playing rate information for the target image in the first state and user-wise playing rate information for the target image in the second state, based on the state information and the image playing information of the target image.

The providing may further include providing accumulated playing rate information for the target image in the first state and the target image in the second state for each user, by using the image playing information.

The target image request signal may include user information of the user terminal, and the method may further include transmitting the user information of the user terminal to another user terminal that has user-wise playing rate information identification authority, in response to receiving, from the another user terminal, user information request signal regarding on or more users who have played the target image.

The image playing information may include information related to image playing of the user terminal, the user information request signal may include specific playing time information of the target image, and the transmitting the user information of the user terminal to the another user terminal may include transmitting, to the another user terminal, the user information of the user terminal that played the target image at a specific playing time, by using the information related to image playing of the user terminal.

The method may further include providing user-wise playing section information regarding the target image in the first state and user-wise playing section information regarding the target image in the second state.

An apparatus for providing image playing rate information, according to another example embodiment of the present disclosure, may include a processor configured to receive a target image request signal from a user terminal, transmit, to the user terminal, a target image in a first state or the target image in a second state, based on whether the target image request signal satisfies a specified standard, obtain, from the user terminal, state information and image playing information of the target image for each specified time, and provide user-wise playing rate information of the target image, based on the state information and image playing information of the target image.

The target image request signal may include time information about a time when the target image request signal is received from the user terminal, and the processor may be further configured to transmit, to the user terminal, the target image in the first state, which is a real-time image, when a time when the target image request signal is received is included in a real-time target image broadcasting time section, and transmit, to the user terminal, the target image in the second state, which is a stored image, when the time when the target image request signal is received is after the real-time target image broadcasting time section.

The target image request signal may include user information of the user terminal, and the processor may be further configured to transmit, to the user terminal, the target image in the first state or the target image in the second state, based on presence of target image playing authority that has been determined based on the user information.

The image playing information may include information related to image playing of the user terminal, and the processor may be further configured to obtain a data pair including the state information and information related to image playing of the target image received by the user terminal, for each specified time section, based on a playing time of the target image.

The processor may be further configured to provide user-wise playing rate information for the target image in the first state and user-wise playing rate information for the target image in the second state, based on the state information and the image playing information of the target image.

The processor may be further configured to provide accumulated playing rate information for the target image in the first state and the target image in the second state for each user, by using the image playing information.

The target image request signal may include user information of the user terminal, and transmitting the user information of the user terminal to another user terminal that has user-wise playing rate information identification authority, in response to receiving, from the another user terminal, a user information request signal regarding one or more users who have played the target image.

The image playing information may include information related to image playing of the user terminal, the user information request signal may include specific playing time information of the target image, and the processor may be further configured to transmit, to the another user terminal, the user information of the user terminal that has played the target image at a specific playing time, by using the information related to image playing of the user terminal.

According to an example embodiment, there is provided a non-transitory computer readable medium storing a computer program that, when executed by a processor, causes a computer to execute the aforementioned method.

Other aspects, features, and advantages may become clear from the following drawings, the claims, and the detailed description of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 8 illustrates an example of a GUI configuration for a screen where user-wise playing rate information with respect to a real-time image is identified, according to an example embodiment of the present disclosure;

FIG. 11 illustrates an example of a GUI configuration for a screen where user-wise accumulated playing rate information with respect to a specific image is identified, according to an example embodiment of the present disclosure; and FIG. 12 is a diagram for describing accumulated playing rate information according to an example embodiment of the present disclosure.

Figure 1:
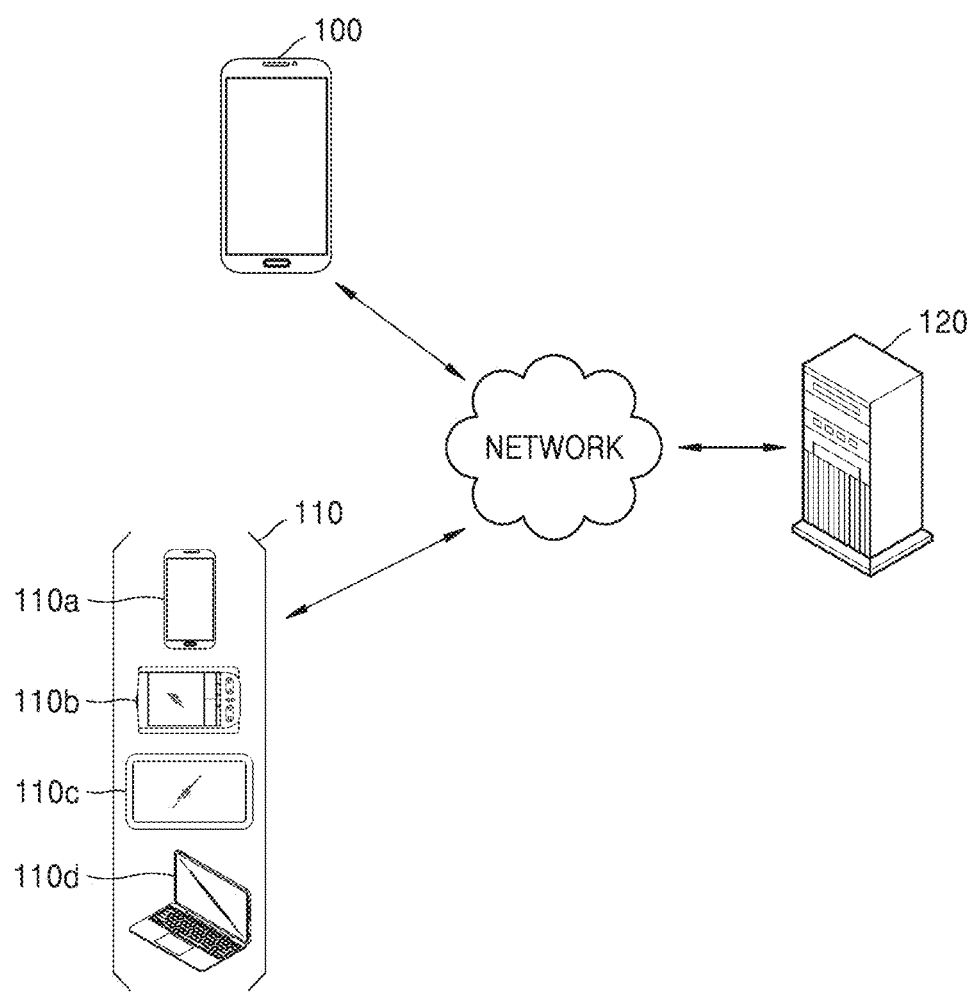
FIG. 1 is a diagram of a configuration of a system for providing image playing rate information, according to an example embodiment of the present disclosure.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. For example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description.

However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

The detailed description of the present disclosure to be described below refers to the accompanying drawings, which illustrate specific example embodiments in which the present disclosure may be practiced. These example embodiments are described in sufficient detail to enable one of ordinary skill in the art to practice the present disclosure. It is to be understood that various example embodiments of the present disclosure are different from each other, but need not be mutually exclusive. For example, specific shapes, structures, and characteristics described herein may be changed from one example embodiment to another example embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

Hereinafter, various example embodiments of the present disclosure will be described in detail with reference to accompanying drawings to enable one of ordinary skill in the art to easily execute the present disclosure.

FIG. 1 is a diagram of a configuration of a system for providing image playing rate information, according to an example embodiment of the present disclosure.

A network environment of FIG. 1 includes a plurality of user terminals (e.g., a first user terminal 110 and a second user terminal 100), a server 120 for providing image playing rate information, and a network. FIG. 1 is an example for describing the present disclosure and the number of user terminals or the number of servers is not limited to that shown in FIG. 1. The first user terminal 110 may be user terminals 110a, 110b, 110c, and/or 110d.

The plurality of user terminals may be fixed terminals or mobile terminals implemented as computing devices. The plurality of user terminals may be, for example, smart phones, mobile phones, navigation devices, computers, laptop computers, digital broadcasting terminals, personal digital assistants (PDAs), portable multimedia players (PMPs), and table personal computers (PCs). The system for providing image playing rate information according to an example embodiment of the present disclosure may include the server 120 for providing image playing rate information and a first user terminal 110 for playing an image, and may further include the second user terminal 100 for uploading an image according to some example embodiments. For example, the second user terminal 100 may communicate with the other user terminals 110a through 110d and/or the server 120 via the network by using a wireless or wired communication method.

The server 120, the first user terminal 110, and the second user terminal 100 may communicate with each other via the network. A communication method is not limited and may include not only a communication method using a communication network (for example, a mobile communication network, wired Internet, wireless Internet, or a broadcasting network) that may be included in the network, but also short-range wireless communication between devices. For example, the network may include one or more arbitrary network from among networks such as a personal area network (PAN), a local area network (LAN), a campus area network (CAN), a metropolitan area network (MAN), a wide area network (WAN), a broadband network (BBN), and the Internet. Also, the network may include one or more of network topologies including a bus network, a start network, a ring network, a mesh network, a star-bus network, and a tree or hierarchical network, but is not limited thereto.

According to an example embodiment, the first user terminal 110 and the second user terminal 100 may transmit or receive an image to or from the server 120. For example, the first user terminal 110 may upload an image and the second user terminal 100 may receive an image. However, the present disclosure is not limited thereto, and in the system according to an example embodiment, one user terminal may upload and receive an image. In other words, it should be noted that a user terminal uploading an image and a user terminal receiving an image are not necessarily configured as separate hardware.

According to another example embodiment, the first user terminal 110 may have authority to obtain user-wise playing rate information, and the second user terminal 100 may not have authority to obtain user-wise playing rate information. According to the current example embodiment, even when an image playing rate information request signal is received from the second user terminal 100 without the authority, the server 120 may not transmit user-wise playing rate information regarding a target image. In this case, the first user terminal 110 uploading an image may obtain the user-wise playing rate information and use various types of playing information regarding the image. However, the present disclosure is not limited thereto, and it should be noted that authority of a user terminal to obtain user-wise playing rate information, according to an example embodiment of the present disclosure, may be determined regardless of uploading of an image. This will be described in detail below with reference to a related drawing.

The server 120 according to some example embodiments of the present disclosure may generate and provide the user-wise playing rate information regarding the target image, based on information about a user terminal that played the target image. According to an example embodiment, at least one image and user-wise playing rate information regarding each image may be stored in a database of the server 120, but according to another example embodiment, image data may be stored in an external server or a separate storage medium to secure a sufficient storage space.

According to an example embodiment, the server 120 may provide the user-wise playing rate information by further using state information of the target image. For example, the target image may be an image transmitted in real-time or may be a stored image. In other words, a user terminal that received the target image during a determined broadcasting time section may receive a real-time image, and a user terminal that received the target image after the determined broadcasting time section may receive a stored image. In this case, the server 120 may generate image playing rate information based on the state information of the received target image, for each user terminal.

According to another example embodiment, the server 120 may further generate information related to image playing for each other, regarding a specific playing time regarding the target image. Accordingly, not only playing rate information regarding the specific playing time of the target image, but also user information regarding a user who played the target image at the specific playing time may be obtained. Then, the server 120 according to the current example embodiment may obtain and analyze a pattern of using, by the user, an image platform, by using the user information.

Figure 2:
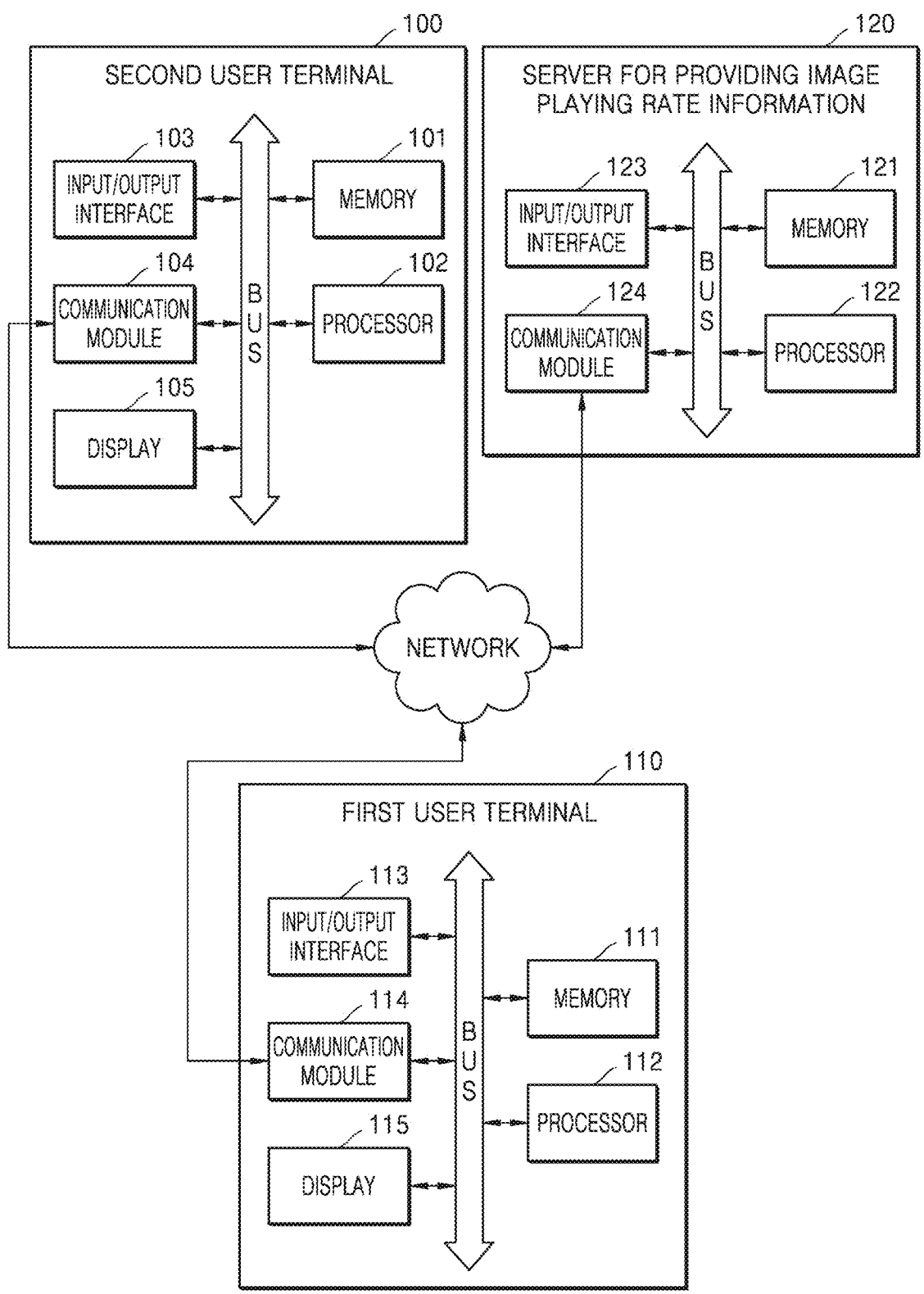
FIG. 2 is a diagram for describing a configuration and operations of an apparatus for performing a method of providing image playing rate information, according to an example embodiment of the present disclosure.

FIG. 2 is a diagram for describing a configuration and operations of an apparatus for performing a method of providing image playing rate information, according to an example embodiment of the present disclosure.

The second user terminal 100, the first user terminal 110, and the server 120 for performing the method of providing image playing rate information, according to an example embodiment, may include memories 101, 111, and 121, processors 102, 112, and 122, input/output interfaces 103, 113, and 123, and communication modules 104, 114, and 124, respectively, and according to some example embodiments, the second user terminal 100 and first user terminal 110 may further include displays 105 and 115, respectively.

The memories 101, 111, and 121 are computer-readable recording media, and may include random access memory (RAM), read-only memory (ROM), and a permanent mass storage device such as a disk drive. Also, the memories 101, 111, and 121 may temporarily or permanently store program code for controlling the second user terminal 100, first user terminal 110, and server 120, settings, images, user information, and image playing information.

The processors 102, 112, and 122 may be configured to process an instruction of a computer program by performing basic arithmetic, logic, and input/output operations. The instruction may be provided to the processors 102, 112, and 122 by the memories 101, 111, and 121 or the communication modules 104, 114, and 124. For example, the processors 102, 112, and 122 may be configured to execute a received instruction according to program code stored in recording devices, such as the memories 101, 111, and 121. The processor 122 of the server 120 according to an example embodiment of the present disclosure may receive a target image request signal from the second user terminal 100. In response, the processor 122 may transmit, to the second user terminal 100, a target image in a first state or the target image in a second state, by using whether the target image request signal satisfies a specified standard. Then, the processor 122 may obtain, from the second user terminal 100, state information and image playing information of the target image for each specified time, and generate user-wise playing rate information of the target image, based on the state information and image playing information of the target image.

The communication modules 104, 114, and 124 may provide a function for communication via a network. For example, a request generated by the processor 112 of the first user terminal 110 according to program code stored in a recording medium, such as the memory 111 may be transmitted to the server 120 through the network, according to a control of the communication module 114. According to another example embodiment, a control signal, instruction, content, file, or the like provided according to a control of the processor 122 of the server 120 may be transmitted to the second user terminal 100 via the communication module 104 through the network. For example, the control signal or instruction of the server 120 received via the communication module 104 of the second user terminal 100 may be transmitted to the processor 102 or memory 101 of the second user terminal 100, and the content or file may be stored in a storage medium that may be further included in the second user terminal 100. A communication method is not limited, but the network may be a short-range wireless communication network. For example, the network may be a Bluetooth, Bluetooth low energy (BLE), or Wi-Fi communication network.

The input/output interfaces 103, 113, and 123 may be a unit for an interface with an input/output device. For example, an input device may include a device such as a keyboard or a mouse, and an output device may include a device such as the display 105 or 115 for displaying a communication session of an application. As another example, the input/output interfaces 103, 113, and 123 may be a unit for an interface with a device in which functions for input and output are integrated, such as a touch screen. For example, with respect to the processor 112 of the first user terminal 110 processing an instruction of a computer program loaded on the memory 111, a service screen or content configured by using data provided by the server 120 or second user terminal 100 may be displayed on the display 115 via the input/output interface 113.

According to another example embodiment, the first user terminal 110, the second user terminal 100, and the server 120 may include more components than those shown in FIG. 2. However, there is no need to clearly illustrate most of components of the related art. For example, the first user terminal 110 and second user terminal 100 may each include a battery or charging device for supplying power to components therein, may be implemented to include at least a part of the input/output device, or may further include other component, such as a transceiver, a global positioning system (GPS) module, various sensors, and a database.

Figure 3:
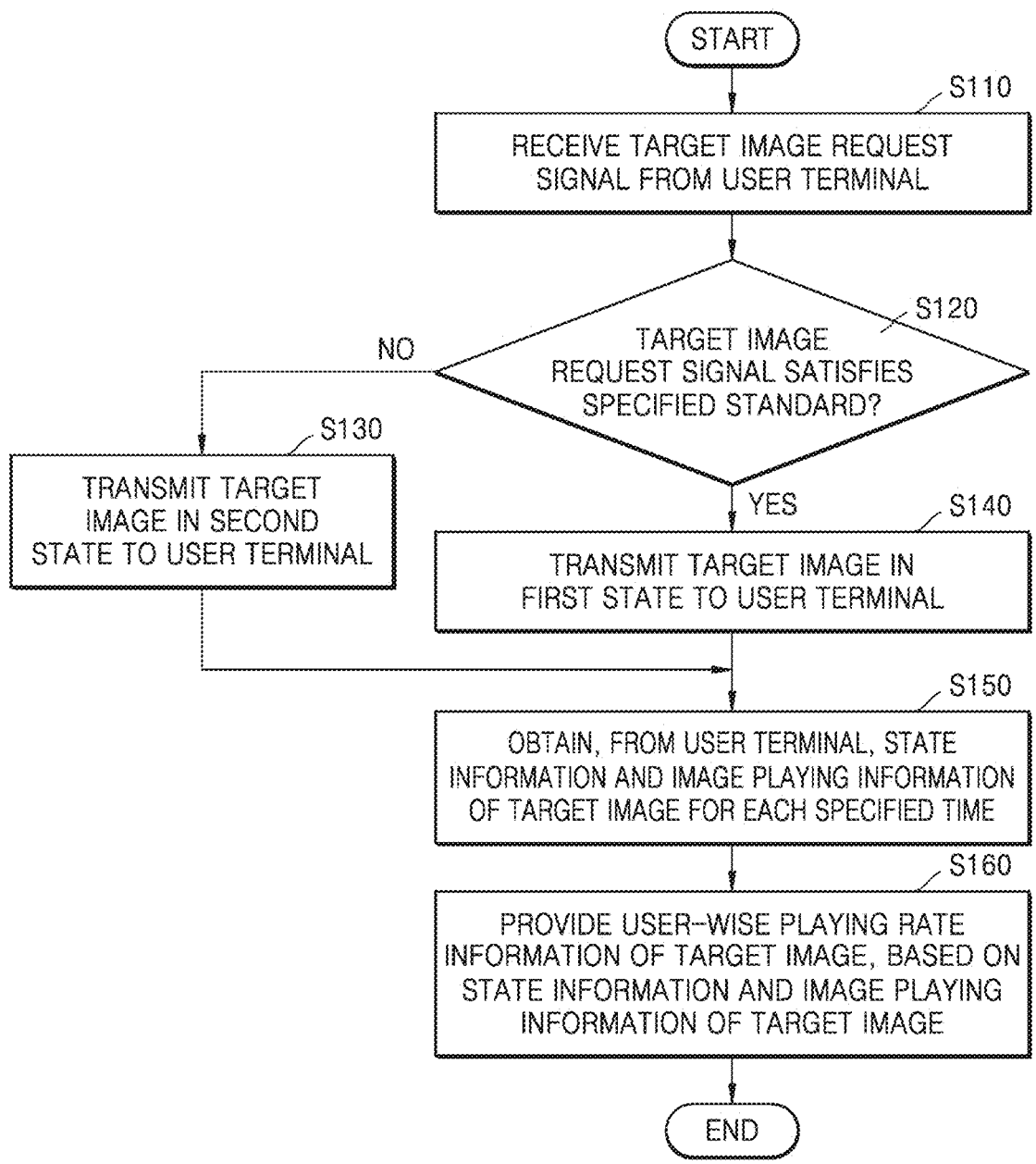
FIG. 3 is a flowchart of a method of providing image playing rate information, wherein operations of the method is illustrated in a time-series order, according to an example embodiment of the present disclosure.

FIG. 3 is a flowchart of a method of providing image playing rate information, wherein operations of the method is illustrated in a time-series order, according to an example embodiment of the present disclosure.

As described above, a system for providing image playing rate information, according to an example embodiment may include a user terminal and a server for providing image playing rate information. The method described below is performed by the server, but according to some example embodiments of the present disclosure, not all operations of the method are performed by the server, and at least one operation may be performed by the user terminal. Hereinafter, for clear description of the present disclosure, a subject of performing the method is described to be an electronic device. As described above, the electronic device may be the server or an external server connected via a network. A specific operating subject of each operation will be described in detail below with reference to FIG. 4.

In operation S110, the electronic device may receive a target image request signal from a user terminal. For playing of a target image, the user terminal may transmit the target image request signal to the electronic device by using the network communication described above.

In operation S120, the electronic device may determine whether the target image request signal satisfies a specified standard. The target image request signal according to an example embodiment may include at least one of time information and user information.

According to an example embodiment, the time information may include time information about a time when the target image request signal is received from the user terminal or time information about a time when the target image request signal is transmitted from the user terminal. According to the current example embodiment, the electronic device may determine whether the time information of the target image request signal is included in real-time target image broadcasting time section.

According to an example embodiment, the user information may include user information of the user terminal that transmitted the target image request signal. The user information may include at least one of a presence of target image playing authority of the user terminal, a presence of user-wise playing rate information identification authority of the user terminal regarding the target image, or use information of the user terminal. For example, the electronic device may use the user information to determine whether there is the target image playing authority of the user terminal that transmitted the target image request signal.

Then, the electronic device may transmit, to the user terminal, the target image in a first state or the target image in a second state, based on whether the target image request signal satisfies the specified standard. For example, when the target image request signal satisfies the specified standard, according to an example embodiment, the electronic device may transmit the target image in the first state to the user terminal, in operation S140. According to an example embodiment, when the target image request signal does not satisfy the specified standard, the electronic device may transmit, to the user terminal, the target image in the second state different from the first state, in operation S130.

According to an example embodiment, the electronic device may transmit, to the user terminal, the target image in the first state, which is a real-time image, when the time when the target image request signal is received is included in the real-time target image broadcasting time section. The electronic device may transmit, to the user terminal, the target image in the second state, which is a stored image, when the time when the target image request signal is received is after the real-time target image broadcasting time section.

According to an example embodiment, the electronic device may store and manage the real-time image and the stored image as separate target images. According to the current example embodiment, even for an image of same content, the target image request signal for the real-time image and the target image request signal for the stored image may be different from each other. In this case, the electronic device that received the target image request signal may transmit the target image included in the target image request signal without having to consider the state information of the target image.

According to another example embodiment, depending on the presence of the target image playing authority based on the user information, the electronic device may transmit the target image in the first state (e.g., the real-time or stored image), to the user terminal with the target image playing authority, or transmit the target image in the second state (e.g., a restricted image), to the user terminal without the target image playing authority. According to some example embodiments, the restricted image may be an image restricted in various forms by the server or the user terminal that uploaded the image. For example, the restricted image may be in a state different from the first state described above, for example, an image in which playing of only some of an entire playing section is allowed, an image in which the quality is restricted, or an image connected to a separate authority obtaining page. According to some example embodiments, the electronic device may not distinguish output states of the target image in the second state and the target image in the first state. In this case, the electronic device may separately store authority information of users who played the target image, by using the state information of the target image played by the user terminal.

In operation S150, the electronic device may obtain, from the user terminal, state information and image playing information of the target image for each specified time. The image playing information according to an example embodiment may include information related to image playing of the user terminal. In this case, the electronic device may obtain a data pair including the state information and the information related to image playing of the target image received by the user terminal, for each specified time section, based on a playing time of the target image. According to an example embodiment, when the electronic device obtains the data pair for each specified time section, the electronic device may further generate target image playing information of the user regarding the playing time, by using the data pair.

In operation S160, the electronic device may generate user-wise playing rate information of the target image, based on the state information and image playing information of the target image. The electronic device may generate the user-wise playing rate information according to a state of the target image. For example, user-wise playing rate information regarding the real-time image and user-wise playing rate information regarding the stored image may be generated. Also, the electronic device may provide not only image playing rate information, but also playing section information. In this case, the electronic device may provide playing section information regarding the real-time image and playing section information regarding the stored image, for each user.

According to another example embodiment, the electronic device may generate accumulated playing rate information for the target image in the first state and the target image in the second state for each user, by using the image playing information. As described above, the electronic device according to some example embodiments of the present disclosure is able to further obtain the playing section information of the user regarding the target image, and thus the accumulated playing rate information regarding the target image may be generated based on the playing section information that does not overlap regarding the real-time image and the stored image. This will be described in detail below with reference to a related drawing.

Figure 4:
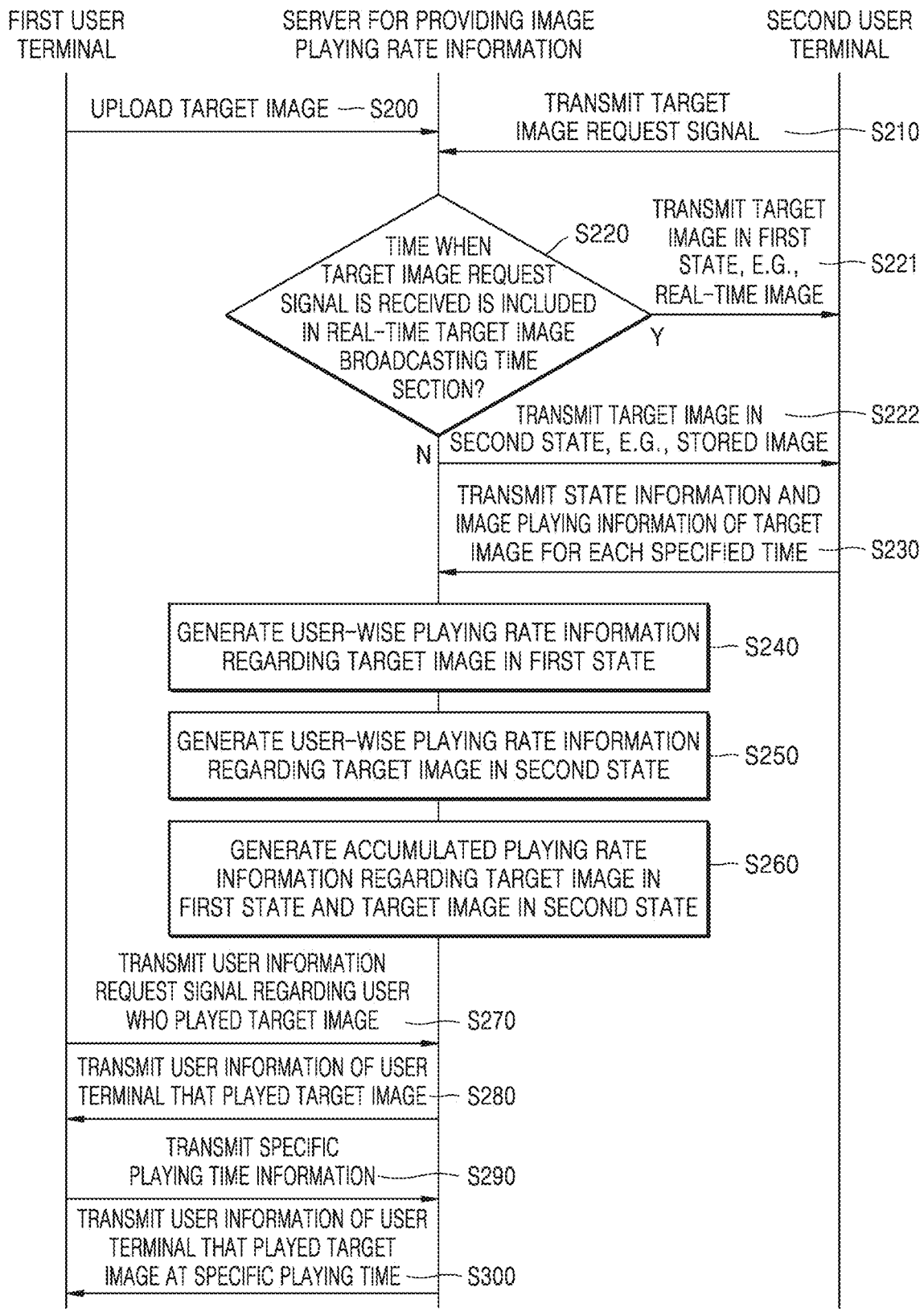
FIG. 4 is a flowchart of a method of providing image playing rate information, wherein the method is illustrated according to operating subjects, according to an example embodiment of the present disclosure.

FIG. 4 is a flowchart of a method of providing image playing rate information, wherein the method is illustrated according to operating subjects, according to an example embodiment of the present disclosure.

A second user terminal shown in FIG. 4 may be a user terminal that plays a target image and a first user terminal may be a user terminal that uploads the target image in a server for providing image playing rate information. According to some example embodiments of the present disclosure, a user terminal may obtain user-wise playing rate information of the target image from the server only when there is specified authority. According to an example embodiment, when there is the specified authority, the second user terminal and the first user terminal may obtain the user-wise playing rate information, and according to another example embodiment, the user-wise playing rate information may be obtained only for the first user terminal with the specified authority. According to some example embodiments of the method described below, a case where the first user terminal obtains the user-wise playing rate information will be described.

In operation S200, the first user terminal may transmit the target image to the server.

Meanwhile, in operation S210, the second user terminal may transmit a target image request signal to the server. Then, the server may identify whether a time when the target image request signal is received is included in a real-time target image broadcasting time section, in operation S220.

According to an example embodiment, when the target image request signal is included in the real-time target image broadcasting time section, the server may transmit the target image in the first state to the second user terminal, in operation S221. In this case, the target image may be transmitted from the server to the second user terminal in real-time.

According to an example embodiment, when the target image request signal is not included in the real-time target image broadcasting time section, the server may transmit the target image in the second state to the second user terminal, in operation S222. In this case, the target image is a stored image, and information of the target image may be transmitted from the server to the second user terminal all at once.

According to an example embodiment, an electronic device may store and manage the real-time image and the stored image as separate target images. According to the current example embodiment, even for an image of same content, the target image request signal for the real-time image and the target image request signal for the stored image may be different from each other.

In operation S230, the second user terminal that received the target image may transmit, to the server, state information and image playing information of the target image for each specified time.

Then, according to an example embodiment, when the state information of the target image received from the second user terminal at a specific time is the first state, the server may generate user-wise playing rate information regarding the target image in the first state, in operation S240.

According to an example embodiment, when the state information of the target image received from the second user terminal at a specific time is the second state, the server may generate user-wise playing rate information regarding the target image in the second state, in operation S250.

Then, in operation S260, the server may generate accumulated playing rate information regarding the target image in the first state and the target image in the second state.

In operation S270, the first user terminal may transmit, to the server, a user information request signal regarding a specific user who played the target image.

In operation S280, the server may transmit, to the first user terminal, user information of a specific user terminal that played the target image. According to an example embodiment, when the server receives the target image request signal from the second user terminal, the target image request signal may further include user information of the second user terminal. Accordingly, in response to receiving a user information request signal regarding a user who played the target image, from the first user terminal with user-wise playing rate information identification authority, the server may transmit the user information of the second user terminal to the first user terminal.

In operation S290, the first user terminal may transmit, to the server, specific playing time information among a playing time of the target image. Then, in operation S300, the server may transmit, to the first user terminal, user information of a user terminal that played the target image at a received specific playing time. According to an example embodiment, when the server receives the target image request signal from the second user terminal, the image playing information may include information related to image playing of the second user terminal. In this case, the server may transmit, to the first user terminal, the user information of the second user terminal that played the target image at the specific playing time, by using the information related to image playing of the second user terminal.

Figure 5:
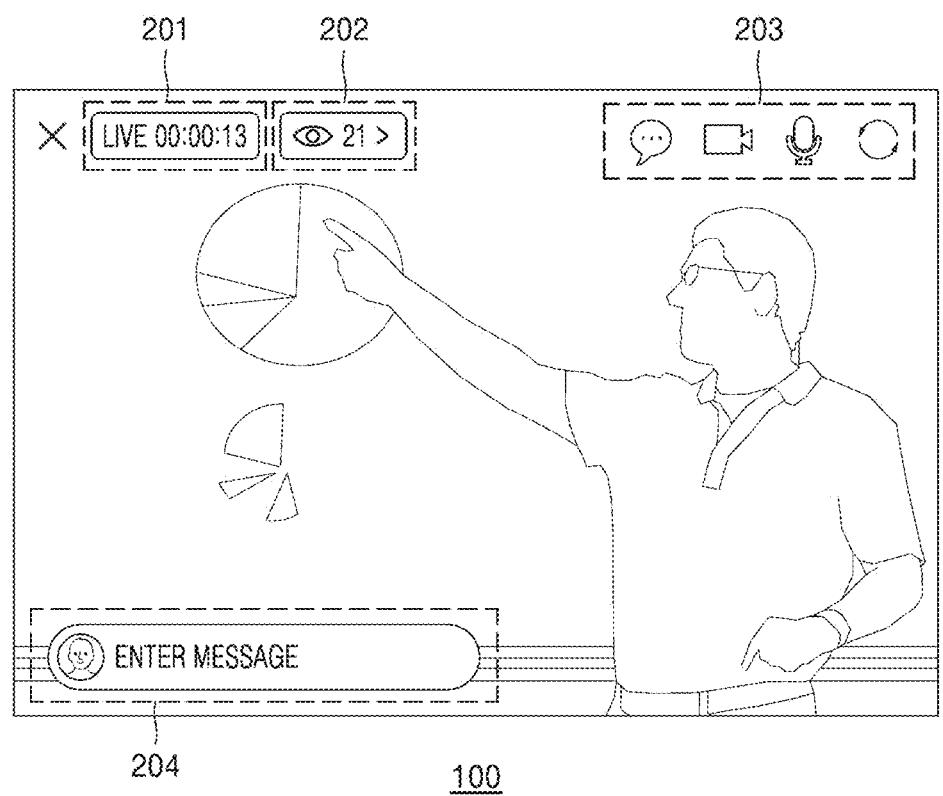
FIG. 5 illustrates an example of a graphics user interface (GUI) configuration for a screen of a user terminal, where an image is played, according to an example embodiment of the present disclosure.

FIG. 5 illustrates an example of a graphics user interface (GUI) configuration for a screen of the second user terminal 100, where an image is played, according to an example embodiment of the present disclosure. FIG. 5 is only an example of a GUI output on a display of the second user terminal 100 for clear description of the present disclosure, and according to some example embodiments, a configuration and shape of the GUI displayed on the display of the second user terminal 100 are not limited thereto.

According to an example embodiment, the second user terminal 100 may transmit a target image request signal to a server for providing image playing rate information, and the server may transmit a target image to the second user terminal 100 when the target image request signal satisfies a certain condition. For example, when the second user terminal 100 transmitted the target image request signal to the server during a real-time target image broadcasting time section, the second user terminal 100 may receive the target image transmitted in real-time from the server.

According to an example embodiment, upon receiving the target image from the server, the second user terminal 100 may output the target image on a partial region of the display. The display of the second user terminal 100 may further display a user interface (UI) object 201 for displaying state information of the target image, a UI object 202 for displaying information of other user terminal(s) playing the target image, a UI object 203 for various settings of an image platform, and a chat UI object 204 for talking with another user. For example, the display of the second user terminal 100 may display a UI object indicating whether the target image is a recorded image or a real-time image, or display a UI object indicating a playing time of the target image. Also, the display may further display a UI object indicating the number or user information of other user terminals playing the target image. Referring to FIG. 5, it is identified that the second user terminal 100 is playing the target image transmitted in real-time, and the number of user terminals currently playing the target image is 21.

When a user terminal according to some example embodiments of the present disclosure plays a target image by using an image platform in units of communities, the server may further obtain user information regarding a user who subscribed to a corresponding community. According to the current example embodiment, the server may obtain user information from the user terminal playing the target image and further provide information about a user who subscribed to a community from among users currently playing the target image. This will be described in detail with reference to FIG. 6.

Figure 6:
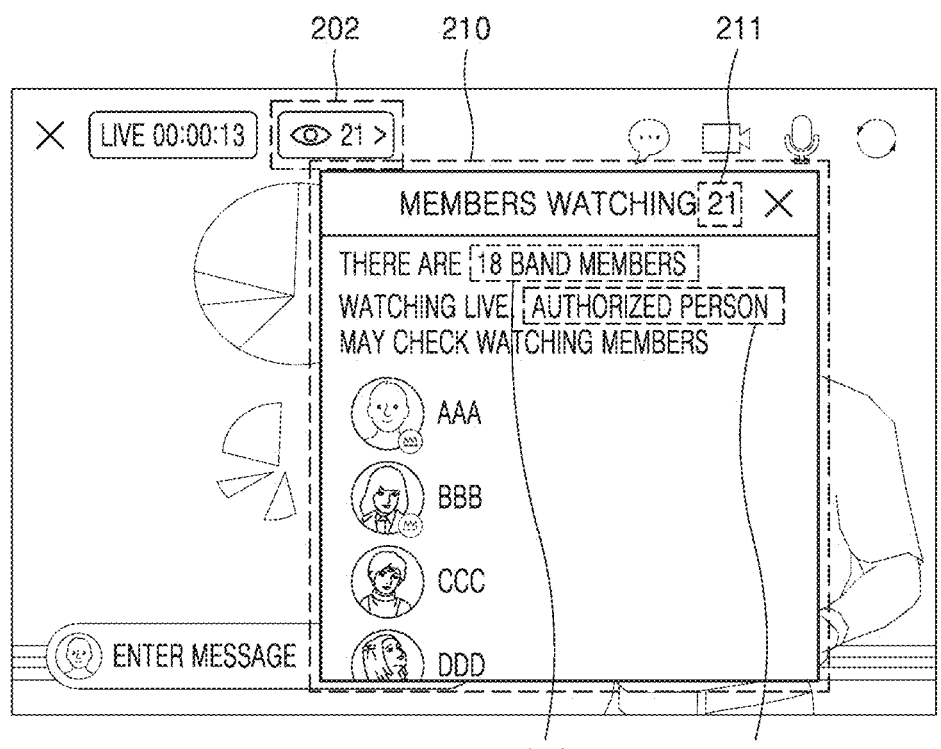
FIG. 6 illustrates an example of a GUI configuration for a screen of a user terminal, where user information playing an image is identified, according to an example embodiment of the present disclosure.

FIG. 6 illustrates an example of a GUI configuration for a screen of the second user terminal 100, where user information playing an image is identified, according to an example embodiment of the present disclosure.

According to an example embodiment, when a user input of selecting the UI object 202 for displaying information of another user terminal playing the target image is received, the second user terminal 100 may further display user information 210 of user terminals currently playing the target image. FIG. 6 illustrates an example, in which the user information 210 is displayed in a form of a popup window. As described above, according to some example embodiments of the present disclosure, a method of displaying the user information 210 of the user terminals currently playing the target image is not limited to a configuration and shape of a GUI of FIG. 6.

According to an example embodiment, the server may transmit, to the second user terminal 100, the user information 210 regarding all users currently playing the target image, and according to some example embodiments, may further transmit user information regarding a user who subscribed to a specific community from among the all users. For example, referring to FIG. 6, the number 211 of user terminals currently playing the target image is 21, among the user terminals, the number 212 of user terminals of users who subscribed to a specific community is 18.

According to some example embodiments of the present disclosure, the server may transmit the user information 210 of user terminals playing the target image only to the second user terminal 100 with authorization. The authorization may be assigned by the server, an image uploading terminal, or an external server. For example, the server may assign authority to identify the user information 210 of user terminals playing the target image, only to a user terminal that uploaded the target image. According to some example embodiments, the server may assign the authority to identify the user information 210, only to a user terminal of a user who subscribed to the specific community. According to the current example embodiment, the display of the second user terminal 100 playing the target image may display whether there is authority 213 to identify the user information 210 of the user terminals playing the target image.

Figure 7:
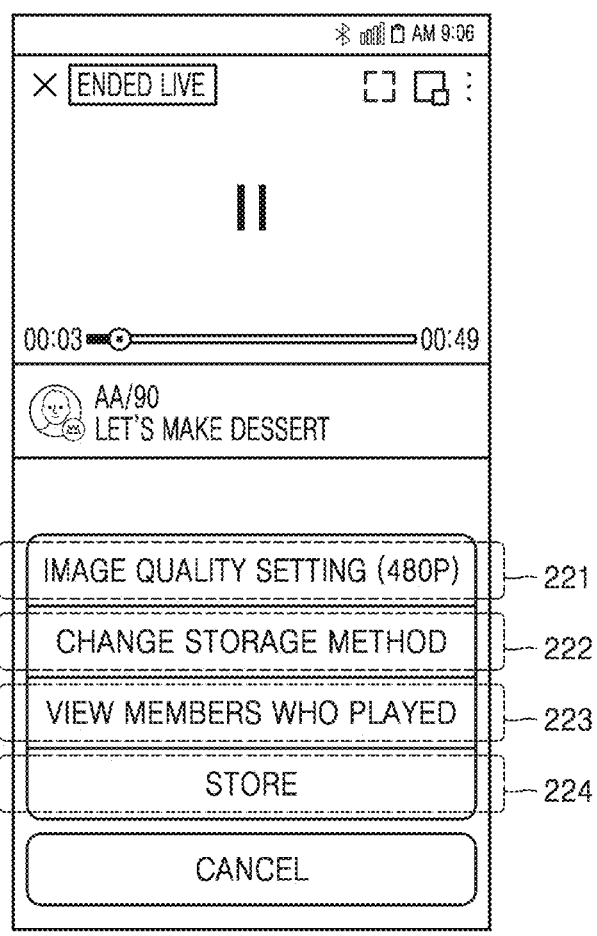
FIG. 7 illustrates an example of a GUI configuration for a screen of a user terminal having authority, where user information reproducing a target image is identified, according to an example embodiment of the present disclosure.

FIG. 7 illustrates an example of a GUI configuration for a screen of the second user terminal 100 having authority, where user information playing a target image is identified, according to an example embodiment of the present disclosure.

Hereinafter, an example of a GUI configuration of a display of the second user terminal 100 that received the target image in a stored state will be described with reference to FIG. 7.

A method of providing image playing rate information, according to an example embodiment of the present disclosure may include displaying a UI object 223 for identifying user information of a user terminal that played the target image, only for the second user terminal 100 with authorization. In the method according to some example embodiments, authority to identify user information of a user terminal currently playing the target image and authority to identify user-wise playing rate information of the target image described below may be separate authorities independently assigned to user terminals.

According to an example embodiment, when the second user terminal 100 receives the stored target image after a real-time target image broadcasting time section, the display of the second user terminal 100 may display a UI object 224 for storing the target image and a UI object 222 for setting a storage method.

The second user terminal 100 that received the target image may change various settings of the target image. For example, as shown in FIG. 7, the display of the second user terminal 100 may display a UI object 221 for setting image quality of the target image, and as such, some UI objects for changing settings of the target image may be displayed regardless of a state of the target image.

According to an example embodiment, the second user terminal 100 with user-wise playing rate information identification authority may receive, from the server, user-wise playing rate information according to the state of the target image. FIGS. 8 through 11 illustrate examples of GUI configurations of the display of the second user terminal 100, wherein user-wise playing rate information is displayed regarding a case where the target image in a real-time transmitted state is played and a case where the target image in a stored state is played. Hereinafter, a method of identifying a user-wise playing rate according to state information of an image will be described in detail with reference to FIGS. 8 through 11.

Figure 8:
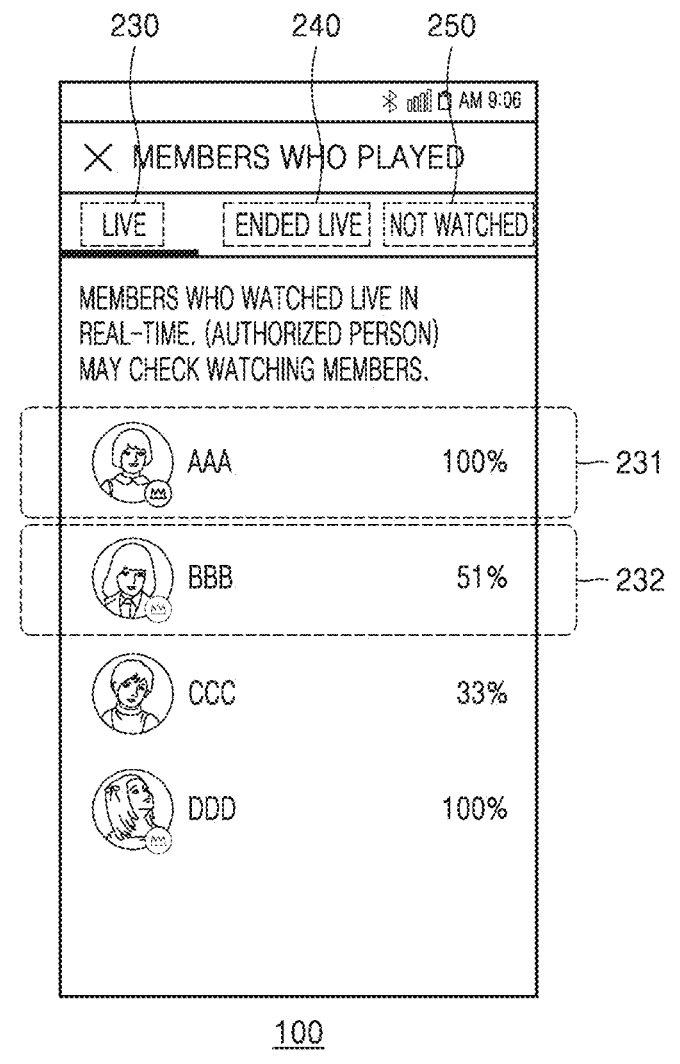

FIG. 8 illustrates an example of a GUI configuration for a screen where user-wise playing rate information with respect to a real-time image is identified, according to an example embodiment of the present disclosure.

The display of the second user terminal 100 having user-wise playing rate information identification authority, according to an example embodiment of the present disclosure may display a UI object 230 for identifying user-wise playing rate information regarding the target image in the first state, and a UI object 240 for identifying user-wise playing rate information regarding the target image in the second state, and may further display, according to some example embodiments, a UI object 250 for identifying user information regarding a user who did not play the target image.

According to an example embodiment, the second user terminal 100 may output user-wise playing rate information of the target image in a real-time transmitted state, in response to a user input regarding the specific UI object 230 for identifying a playing rate of the user regarding a real-time image. FIG. 8 illustrates user-wise playing rate information regarding user terminals that played the target image transmitted in rea-time. Referring to FIG. 8, regarding the target image in the real-time transmitted state, a playing rate of a user AAA is 100% as indicated by a reference numeral 231, a playing rate of a user BBB is 51% as indicated by a reference numeral 232, a playing rate of a user CCC is 33%, and a playing rate of a user DDD is 100%.

Figure 9:
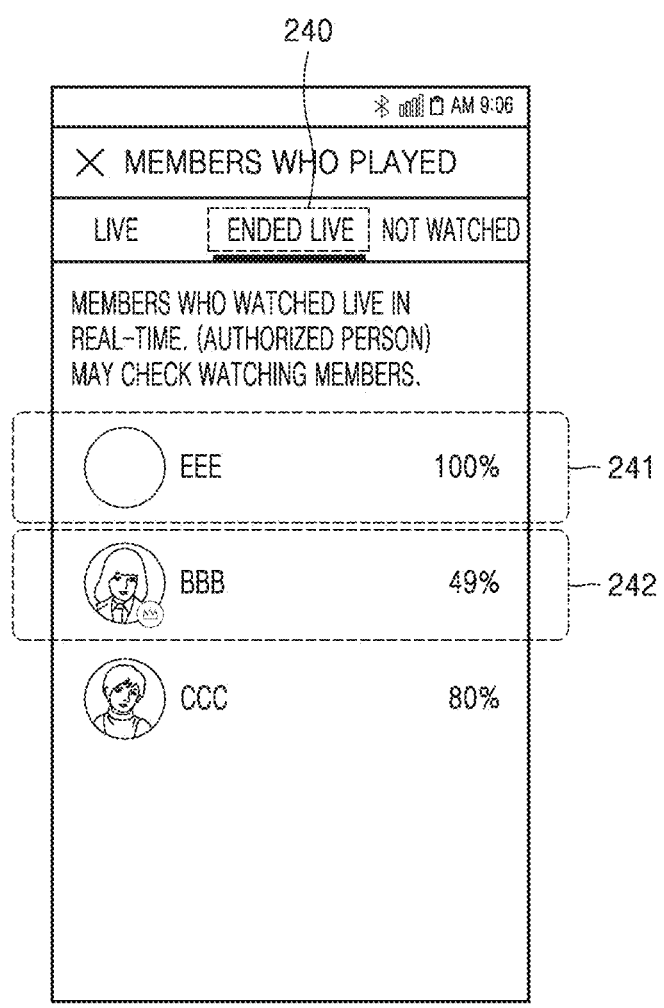
FIG. 9 illustrates an example of a GUI configuration for a screen where user-wise playing rate information with respect to a stored image is identified, according to an example embodiment of the present disclosure.

Also, according to an example embodiment, the second user terminal 100 may output user-wise playing rate information of the target image in a stored state, in response to a user input regarding the specific UI object 240 for identifying a playing rate of the user regarding a stored image. FIG. 9 illustrates user-wise playing rate information regarding user terminals that played the stored target image. As shown in FIG. 9, regarding the target image in the stored state, a playing rate of a user EEE is 100% as indicated by a reference numeral 241, a playing rate of the user BBB is 49% as indicated by a reference numeral 242, and a playing rate of the user CCC is 80%.

When an image is uploaded in a specified community, according to some example embodiments of the present disclosure, it is desired to identify whether a user of a user terminal that played the image is subscribed to the community. Accordingly, in the current example embodiment, the server may further obtain user information regarding a user who subscribed to the community, and separately display the user who subscribed the community when the user-wise playing rate information regarding the target image is provided.

Figure 10:
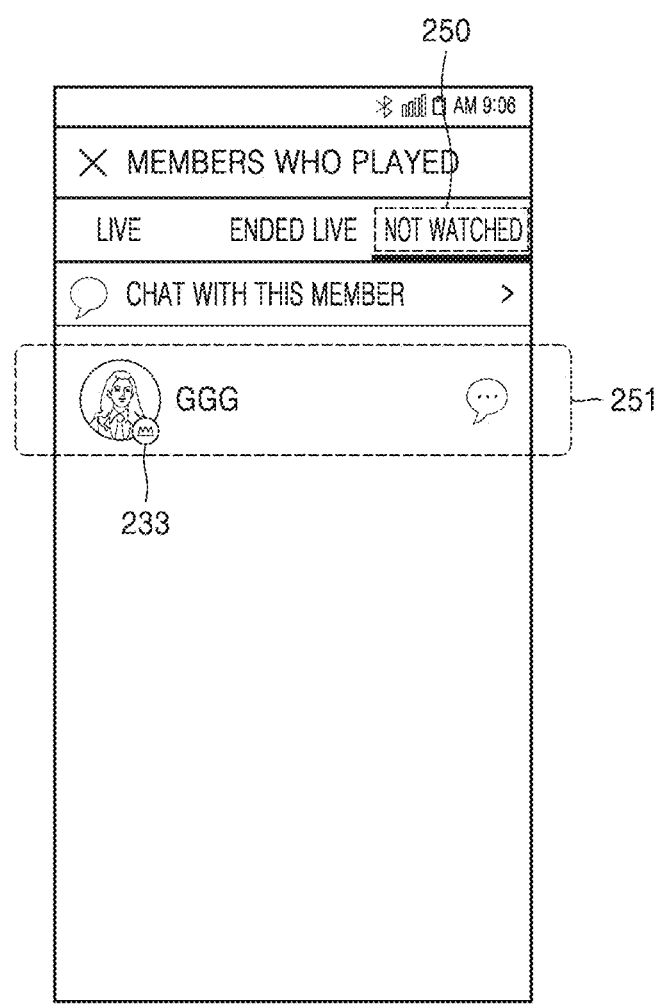
FIG. 10 illustrates an example of a GUI configuration for a screen where user information regarding a user who has not played an image is identified, according to an example embodiment of the present disclosure.

FIG. 10 illustrates an example of a GUI configuration for a screen where user information regarding a user who has not played an image is identified, according to an example embodiment of the present disclosure. Referring to FIG. 10, a case where a separate UI object related to community subscription 233 of each user is further displayed while the user-wise playing rate information is output on the display of the second user terminal 100, according to the above example embodiment, is illustrated. The server may further provide user information 251 regarding a user who did not play the target image, from among a specified user group. For example, a teacher providing an online lecture to students of a specific class needs to identify information about a student who did not play the online lecture, and in this case, the server may transmit the information about the student who did not play the online lecture to a user terminal of the teacher.

Referring to FIGS. 8 and 9, there may be a question about whether an accumulated playing rate of the user BBB whose playing rate for the real-time target image is 51% and playing rate for the stored target image is 49% can be 100%. When the user BBB played a section of the target image overlapping in the real-time transmitted state and in the stored state, an actual playing rate of the user BBB regarding the target image may be less than 100%.

Figure 11:
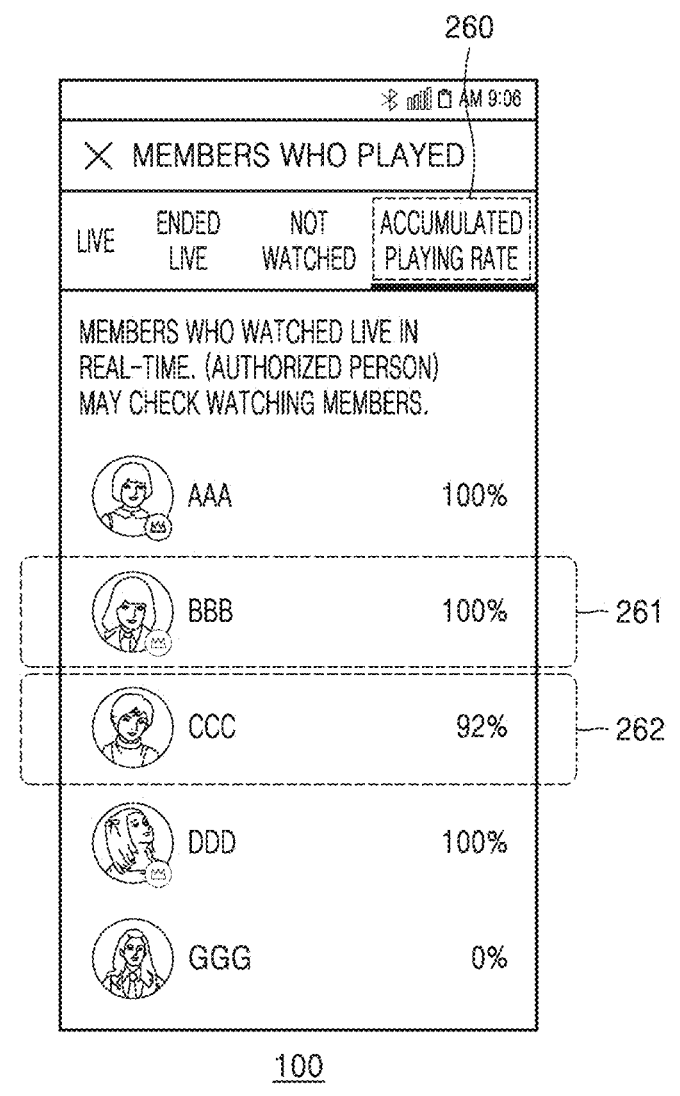

Accordingly, the server according to some example embodiments of the present disclosure may obtain, from a user terminal playing the target image, state information and image playing information of the target image for each specified time, and obtain an actual playing rate of a user, based on a playing section and playing time information of the target image, which are included in the image playing information. Detailed descriptions thereof will be described with reference to FIGS. 11 and 12 below. FIG. 11 illustrates an example of a GUI configuration for a screen where user-wise accumulated playing rate information with respect to a specific image is identified, according to an example embodiment of the present disclosure, and FIG. 12 is an example diagram for describing accumulated playing rate information according to an embodiment of the present disclosure.

The server according to an example embodiment of the present disclosure may further provide accumulated playing rate information regarding the target image, based on user-wise playing rate information regarding the target image in the first state and the target image in the second state.

According to an example embodiment, the second user terminal 100 may output user-wise accumulated playing rate information of the target image, in response to a user input regarding a specific UI object 260 for identifying a user-wise accumulated playing rate regarding the target image. FIG. 11 illustrates user-wise playing rate information regarding user terminals that played at least a partial section of the real-time or stored target image and that did not play the target image. Referring to FIG. 11, regarding an entire playing section of the target image regardless of a state of a played image, an accumulated playing rate of the user AAA is 100%, an accumulated playing rate of the user BBB is 100%, an accumulated playing rate of the user CCC is 92%, and an accumulated playing rate of a user GGG is 0%.

In the user-wise accumulated playing rate information output on the second user terminal 100 of FIG. 11, the accumulated playing rates of the users AAA and BBB are 100% because the playing rates of the target image in the real-time transmitted state are 100%, and the accumulated playing rate of the user GGG is 0% because the user GGG has not played the target image. Hereinafter, a method of obtaining accumulated playing rates of the users BBB and CCC who played a partial section of the target image in a real-time state and a partial section of the target image in a stored state will be described with reference to FIG. 12.

Referring to FIG. 12, regarding the user BBB, the playing rate of the target image in the real-time state is 51%, the playing rate of the target image in the stored state is 49%, and the accumulated playing rate of the target image is 100%. Regarding to user BBB, the accumulated playing rate is 100% because sections 301 and 302 of the target image played in the real-time state and the sections 302 and 303 of the target image played in the stored state do not overlap each other.

On the other hand, regarding the user CCC, the playing rate of the target image in the real-time state is 33% and the playing rate of the target image in the stored state is 80%, but the accumulated playing rate regarding the target image is less than 100%. Regarding the user CCC, the accumulated playing rate is not 100% because there is an overlapping section between 312 and 313 among a section between 311 and 313 of the target image played in the real-time state and a section between 312 and 314 of the target image played in the stored state.

As such, the apparatus according to some example embodiments of the present disclosure may provide a more accurate accumulated playing rate because a playing rate is obtained based on an actual playing section of a user, rather than by using a playing time.

According to an example embodiment, user-wise playing rate information for a target image in a first state, which is a real-time image, user-wise playing rate information for the target image in a second state, which is a stored image, and/or accumulated playing rate information for the target image in the first state and the target image in the second state for each user can be provided based on state information and image playing information of the target image for each specified time that are received from a user terminal. Thus, user-wise playing rate information could be provided without extra monitoring and computations.

The apparatus described above may be realized by a hardware component, a software component, and/or a combination of a hardware component and a software component. For example, the apparatus and component described in some example embodiments may be realized by using one or more general-purpose computers or special purpose computers, such as a processor, a controller, an arithmetic logic unit (ALU), a digital signal processor, a micro-computer, a field programmable gate array (FPGA), a programmable logic unit (PLU), a micro-processor, or any other device capable of executing and responding to an instruction. A processing device may execute an operating system (OS) and one or more software applications executed on the OS. Also, the processing device may access, store, manipulate, process, and generate data in response to execution of software. For convenience of description, it has been described that one processing device is used, but it would be obvious to one of ordinary skill in the art that the processing device may include a plurality of processing elements and/or a plurality of types of processing elements. For example, the processing device may include a plurality of processors or one processor and one controller. Also, another processing configuration, such as a parallel processor, is possible.

The software may include a computer program, a code, an instruction, or a combination thereof, and may configure the processing device to operate as desired or instruct the processing device independently or collectively. The software and/or data may be embodied, permanently or temporarily, by any type of machine, component, physical device, virtual equipment, computer storage medium or device, or transmitted signal wave, such as to be analyzed by the processing device or provided to the processing device. The software may be distributed on a computer system connected to a network, and stored or executed in a distributed manner. The software and data may be stored in one or more computer-readable recording media.

Methods according to some example embodiments may be recorded on a computer-readable recording medium by being implemented in a form of program commands executed by using various computers. The computer-readable recording medium may include at least one of a program command, a data file, and a data structure, independently or collectively. The program commands recorded in the computer-readable recording medium may be specially designed for an example embodiment or well known to one of ordinary skill in the computer software field. The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level language codes executable by a computer by using an interpreter. The hardware device may be configured to operate as one or more software modules to perform operations of an example embodiment, or vice versa.

As described above, some example embodiments have been described with reference to the accompanying drawings, but various modifications and modifications are possible from the above description by one of ordinary skill in the art. For example, appropriate results may be achieved even when the described techniques are performed in an order different from the described method, and/or components, such as a system, a structure, a device, and a circuit, are combined or associated in a form different from the described method, or replaced by other components or equivalents.

Therefore, other implementations, other example embodiments, and equivalents of claims are also within the scope of the claims described below.

The foregoing description has been provided for purposes of illustration and description. It is not intended to be exhaustive or to limit the disclosure. Individual elements or features of a particular example embodiment are generally not limited to that particular example embodiment, but where applicable, are interchangeable and can be used in another example embodiment, even if not specifically shown or described. The same may also be modified in various ways. Such modifications are not to be regarded as a departure from the disclosure, and all such modifications are intended to be included within the scope of the disclosure.

What is claimed is:

1. A method, performed by a computing device, of providing image playing rate information, the method comprising:
   receiving, from a user terminal, a target image request signal;
   transmitting, to the user terminal, a target image in a first state or the target image in a second state, based on whether the target image request signal satisfies a specified standard, the target image in the first state being a real-time image and the target image in the second state being a stored image, the specified standard being whether a point in time at which the target image request signal is received is included in a real-time target image broadcasting section;

obtaining, from the user terminal, a pair of state information and image playing information of the target image for each specified time, the image playing information relating to image playing time of the target image by the user terminal; and providing user-wise playing rate information of the target image, based on the pair of the state information and the image playing information of the target image for each specified time, wherein the providing comprises providing accumulated playing rate information for the target image based on a first playing rate of the target image in the first state and a second playing rate of the target image in the second state for each user, by using the image playing information such that the accumulated playing rate information for the target image is obtained based on an actual playing section of the target image by the user considering an overlap between a first playing section of the target image corresponding to the first playing rate and a second playing section of the target image corresponding to the second playing rate.

2. The method of claim 1, wherein the target image request signal comprises time information about a time when the target image request signal is transmitted from the user terminal, and the transmitting comprises,
  transmitting, to the user terminal, the target image in the first state, when the time when the target image request signal is received is included in a real-time target image broadcasting time section, and
  transmitting, to the user terminal, the target image in the second state, when the time when the target image request signal is received is after the real-time target image broadcasting time section.

3. The method of claim 1, wherein the target image request signal comprises user information of the user terminal, and the transmitting the target image in the first state or the transmitting the target image in the second state comprises transmitting, to the user terminal, the target image in the first state or the target image in the second state, based on a presence of target image playing authority that has been determined based on the user information.

4. The method of claim 1, wherein the image playing information comprises information related to image playing of the user terminal, and the obtaining comprises obtaining the pair of the state information and the information related to image playing of the target image received by the user terminal, for each specified time section, based on a playing time of the target image.

5. The method of claim 1, wherein the providing comprises providing first user-wise playing rate information for the target image in the first state and second user-wise playing rate information for the target image in the second state, based on the state information and the image playing information of the target image.

6. The method of claim 1, wherein the target image request signal comprises user information of the user terminal, and the method further comprises transmitting the user information of the user terminal to another user terminal that has user-wise playing rate information identification authority, in response to receiving, from the another user terminal, a user information request signal regarding one or more users who have played the target image.

7. The method of claim 6, wherein the image playing information comprises information related to image playing of the user terminal, the user information request signal comprises specific playing time information of the target image, and the transmitting the user information of the user terminal to the another user terminal comprises transmitting, to the another user terminal, the user information of the user terminal that has played the target image at a specific playing time, by using the information related to image playing of the user terminal.

8. An apparatus for providing image playing rate information, the apparatus comprising:

a processor configured to
  receive a target image request signal from a user terminal,
  transmit, to the user terminal, a target image in a first state or the target image in a second state, based on whether the target image request signal satisfies a specified standard, the target image in the first state being a real-time image and the target image in the second state being a stored image, the specified standard being whether a point in time at which the target image request signal is received is included in a real-time target image broadcasting section,
  obtain, from the user terminal, a pair of state information and image playing information of the target image for each specified time, the image playing information relating to image playing time of the target image by the user terminal, and
  provide user-wise playing rate information of the target image, based on the pair of the state information and image playing information of the target image for each specified time,
  wherein the processor is further configured to provide accumulated playing rate information for the target image based on a first playing rate of the target image in the first state and a second playing rate of the target image in the second state for each user, by using the image playing information such that the accumulated playing rate information for the target image is obtained based on an actual playing section of the target image by the user considering an overlap between a first playing section of the target image corresponding to the first playing rate and a second playing section of the target image corresponding to the second playing rate.

9. The apparatus of claim 8, wherein the target image request signal comprises time information about a time when the target image request signal is transmitted from the user terminal, and the processor is further configured to, transmit, to the user terminal, the target image in the first state, when a time when the target image request signal is received is included in a real-time target image broadcasting time section, and transmit, to the user terminal, the target image in the second state, when the time when the target image request signal is received is after the real-time target image broadcasting time section.

10. The apparatus of claim 8, wherein
the target image request signal comprises user information of the user terminal, and
the processor is further configured to transmit, to the user terminal, the target image in the first state or the target image in the second state, based on a presence of target image playing authority that has been determined based on the user information.

11. The apparatus of claim 8, wherein
the image playing information comprises information related to image playing of the user terminal, and
the processor is further configured to obtain the pair of the state information and the information related to image playing of the target image received by the user terminal, for each specified time section, based on a playing time of the target image.

12. The apparatus of claim 8, wherein the processor is further configured to provide first user-wise playing rate information for the target image in the first state and second user-wise playing rate information for the target image in the second state, based on the state information and the image playing information of the target image.

13. The apparatus of claim 8, wherein
the target image request signal comprises user information of the user terminal, and
the processor is further configured to transmit the user information of the user terminal to another user terminal that has user-wise playing rate information identification authority, in response to receiving, from the another user terminal, a user information request signal regarding one or more users who played the target image.

14. The apparatus of claim 13, wherein
the image playing information comprises information related to image playing of the user terminal,
the user information request signal comprises specific playing time information of the target image, and
the processor is further configured to transmit, to the another user terminal, the user information of the user terminal that has played the target image at a specific playing time, by using the information related to image playing of the user terminal.

15. A non-transitory computer readable medium storing a computer program that, when executed by a processor, causes a computer to execute the method of claim 1.

16. The method of claim 5, further comprising:
providing first user-wise playing section information regarding the target image in the first state and second user-wise playing section information regarding the target image in the second state.

* * * * *